United States Patent Office.

WILLIAM M. WELLING, OF NEW YORK, N. Y.

Letters Patent No. 77,938, dated May 12, 1868; antedated May 2, 1868.

IMPROVED ARTIFICIAL IVORY.

The Schedule referred to in these Letters Patent and making part of the same.

TO ALL WHOM IT MAY CONCERN:

Be it known that I, WILLIAM M. WELLING, of the city and State of New York, have invented and made a certain new and useful Improvement in Artificial-Ivory Composition; and I do hereby declare the following to be a full, clear, and exact description of the said invention, and of the features which distinguish the same from previous compounds.

This composition is adapted to use in the manufacture of billiard-balls, harness-rings, and many other articles of a useful or ornamental character heretofore made of ivory.

In Letters Patent, granted to me, August 4, 1857, an artificial-ivory composition is described, and the mode in which the same is compounded and prepared.

The ingredients composing my present composition are prepared by finely pulverizing, mixing, heating, grinding, and moulding, in substantially the manner set forth in said Letters Patent, but the materials employed vary.

The following compound shows the ingredients, and about the proportion in which I make use of them: Shellac, about sixteen parts, by weight; camphor, about one part, by weight; talc, about sixteen parts, by weight.

These substances are to be mixed, heated, ground, and moulded, when in a heated state, and the article formed is very strong, resembling ivory, but it is more durable under many circumstances, in view of being uninjured by water and but little affected by acids.

Various colors may be produced by the addition of pigments, such as vermillion, white lead, impalpable white, &c.

What I claim, and desire to secure by Letters Patent, is—

The composition herein specified, prepared as set forth.

In witness whereof, I have hereunto set my signature, this 21st day of October, A. D. 1867.

WM. M. WELLING.

Witnesses:
CHAS. H. SMITH,
GEO. D. WALKER.